INVENTOR.
RALPH CHAPMAN

April 10, 1956     R. CHAPMAN     2,741,165
PULP MOLDING MACHINE

Filed Dec. 13, 1952     3 Sheets-Sheet 3

INVENTOR.
RALPH CHAPMAN
BY
ATTORNEYS

United States Patent Office 2,741,165
Patented Apr. 10, 1956

2,741,165

PULP MOLDING MACHINE

Ralph Chapman, Corvallis, Oreg., assignor to Western Pulp Products, Corvallis, Oreg., a corporation of Oregon Application December 13, 1952, Serial No. 325,850

7 Claims. (Cl. 92—57)

My present invention relates to pulp molding machines of the type adapted to manufacture molded pulp articles such as flower pots, buckets, bottle protectors, berry baskets, trays, egg flats, egg cartons, and others. A principal object of the present invention is to provide a machine for molding articles of the foregoing character which may concurrently produce any or all of dozens of different sizes, shapes, or varieties of such articles. A principal advantage of my present invention resides in the fact that only one mold is required for each article, there being no matching or mating molds required, and this one mold may be readily interchanged for other molds in order that a single machine may be utilized to fill large orders for one article, or to stockpile many different articles.

A further object of the present invention is to provide a machine of the foregoing character which is relatively simple and requires but few adjustments, whereby one machine attendant may control the concurrent production of dozens of different varieties of items without giving more than occasional attendance to the operation of any single part of the machine.

A further object of the present invention is to provide a machine of the foregoing character which is relatively light and easily operated with a minimum consumption of power.

A further object of the present invention is to provide a machine of the foregoing character which is relatively simple, easily fabricated out of ordinarily available materials, and easily maintained in opertion economically to produce pulp articles.

A further object of the present invention is to provide a machine of the foregoing character, all portions of which are easily accessible to a man standing on the floor of any ordinarily available building.

The objects and advantages of the present invention will be more readily understood by reference to the accompanying drawings taken in connection with the following specification wherein like numerals refer to like parts throughout.

Figure 1:
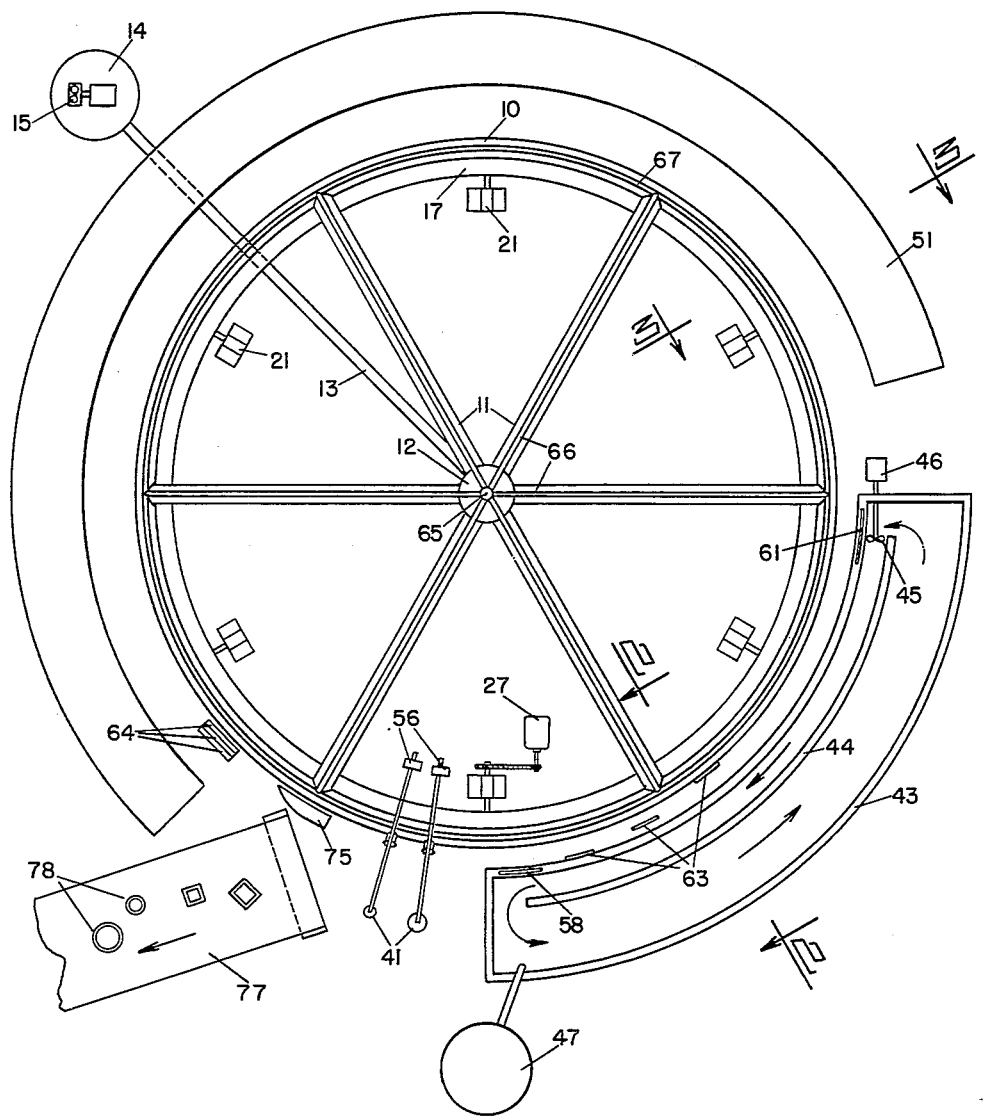
Fig. 1 is a partially schematic, plan view of a machine constructed in accordance with the present invention, only two of the possible dozens of molds being shown.
Figure 2:
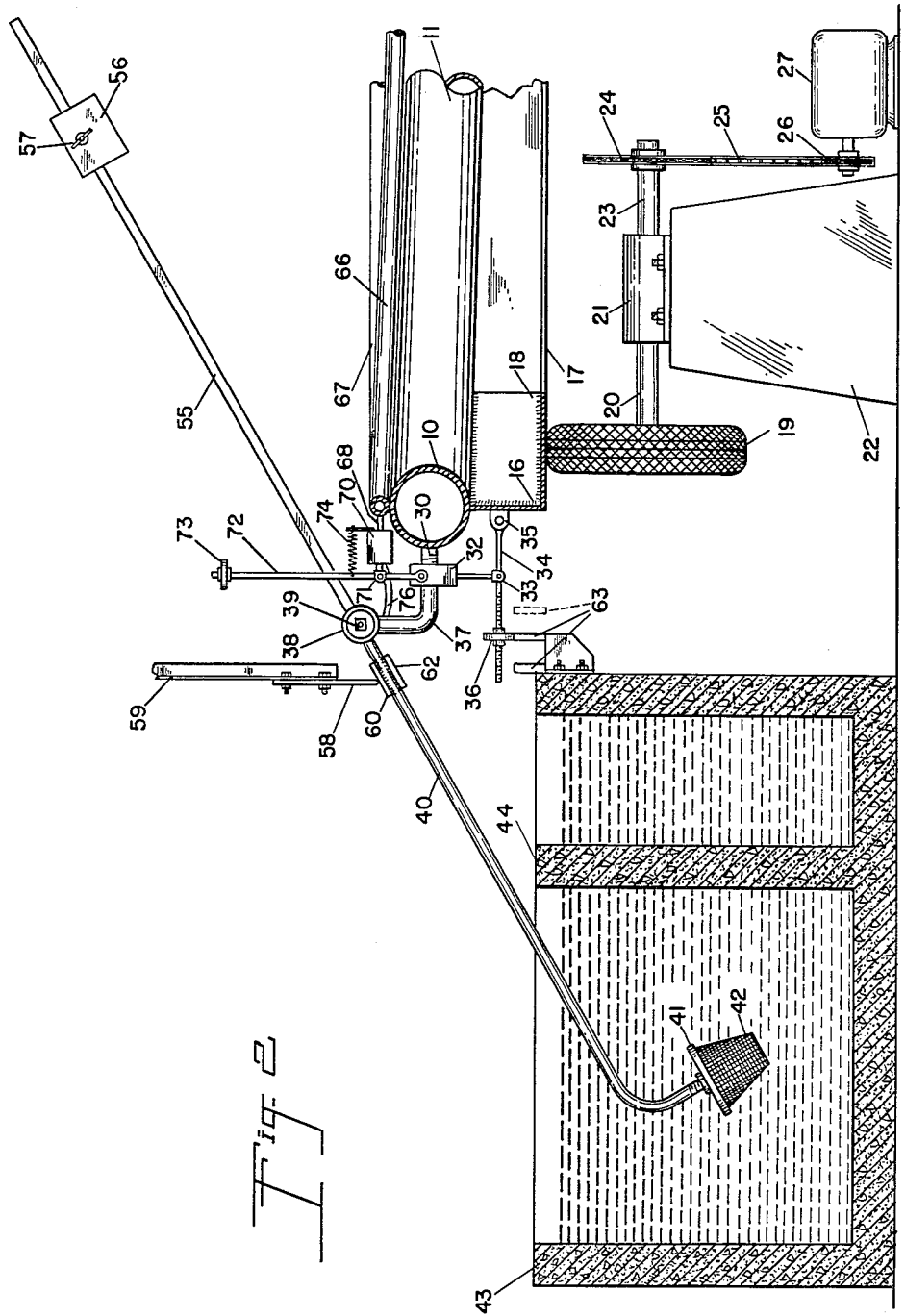
Fig. 2 is an enlarged vertical section taken substantially along the line 2—2 of Fig. 1.

The principal element of my improved machine is a horizontally disposed wheel comprising a rim consisting of a continuous hollow body such as would be affored by welding together curved sections of four-inch steel pipe, such a construction being indicated at 10 in the accompanying drawings. The hollow rim 10 is joined to radial, inwardly inclined, hollow spokes 11, preferably pipe of the same diameter as the rim forming pipes, each of which is connected to a central hollow hub 12. The hollow hub is connected by a suitable swivel joint (not shown) to a drain pipe 13 which leads to a suction tank 14 in which air may be separated from water by any suitable means. For example, a motor-driven, suction pump 15 may constantly exhaust air from the top of the tank 14 and suitable hydraulic trap means (not shown) may constantly permit the escape of water from the bottom of the tank 14. It will be appreciated that the interior of the rim 10, the spokes 11, and the drain 13 are constantly under suction pressure created by the pump 15 so that molding may be accomplished as will be described.

The rim pipe 10 is welded to an annular, vertical flange 16 to which is affixed an annular, horizontal flange 17, the structure being braced by suitable gussets 18 at intervals around the rim. The flange 17 provides a continuous, circular track for the rotating wheel. The wheel, including its track, is supported upon a plurality of pneumatic tired wheels 19 of the type commonly used on wheelbarrows or other small vehicles. The wheels 19 are mounted upon radially disposed, horizontal shafts 20 maintained in journals 21 mounted upon a plurality of concrete standards 22. One of the wheels 19 is positively rotated to provide driving means to rotate the mold assembly. I have found it sufficient, in order to rotate a mold wheel forty feet in diameter, to drive one of the wheels 19, and to effect this by providing one of the shafts 20 with an extension 23 upon which is mounted a sprocket 24 driven by a sprocket chain 25 and a sprocket 26 mounted on the shaft of a one horsepower electric motor 27. An advantage of this construction is that the mold wheel is frictionally driven by means which will slip in the event anything happens to create a jam, thereby protecting the molds and associated mechanism from damage.

On the periphery of the rim pipe 10 I provide a plurality of short, radially extending nipples 30 at distances of approximately one foot. Each of the nipples may have a forming mold arm associated therewith, or many may be closed by a gasketed screw cap 31, as desired. Thus, on a forty foot wheel I may mount approximately one hundred and twenty mold arms, or any lesser number desired. When it is desired to associate a mold arm with one of the nipples 30, the cap 31 is removed and replaced by a valve body 32 from which downwardly projects a valve operating stem 33, the valve being of the type which remains in open or closed condition until moved to the opposite state. The valve stem 33 is pivotally connected to a horizontal actuator arm 34 pivoted to an ear 35 welded to the vertical flange 16, the arm projecting radially outward and supporting a cam wheel 36. The wheel 36 will engage cams, to be described, whereby the valve 32 is opened by one cam, and will remain open until closed by a subsequent cam, and so on. The valve body 32 is connected to an elbow 37 which has a vertical arm terminating in a horizontally disposed swivel joint 38 of the type which includes an adjustable friction device 39, the tension of which may be set to determine the amount of force required to cause the swivel elements to move relative to one another. The movable swivel element is fixed to an end of a tubular mold supporting arm 40, the outer end of which is bent downwardly and communicates with the interior of a mold consisting of a head 41 and a perforate mold body 42 formed to the desired shape. When the valve 32 is opened, suction will be applied to the interior of the mold, and vice versa.

A suitable slurry of pulp is contained in an arcuate tank 43 which is subdivided by an arcuate wall 44 having its ends spaced from the ends of the tank. The molds dip into the slurry in the section of the tank outside of the wall 44 and the slurry therein is preferably caused to move in the direction of movement of the molds and at approximately the speed of the molds whereby any tendency of excess pulp to build up on the forward side of the moving mold is eliminated and the consistency of the pulp is maintained in a uniform state throughout the tank. Movement of the pulp is effected by a propeller 45 located at the appropriate end of the channel between the wall 44 and the inner wall of the tank, the propeller being constantly driven by a motor 46. Makeup pulp is supplied to the tank, preferably at the end into which the mold first dips, from a supply tank 47.

Figure 3:
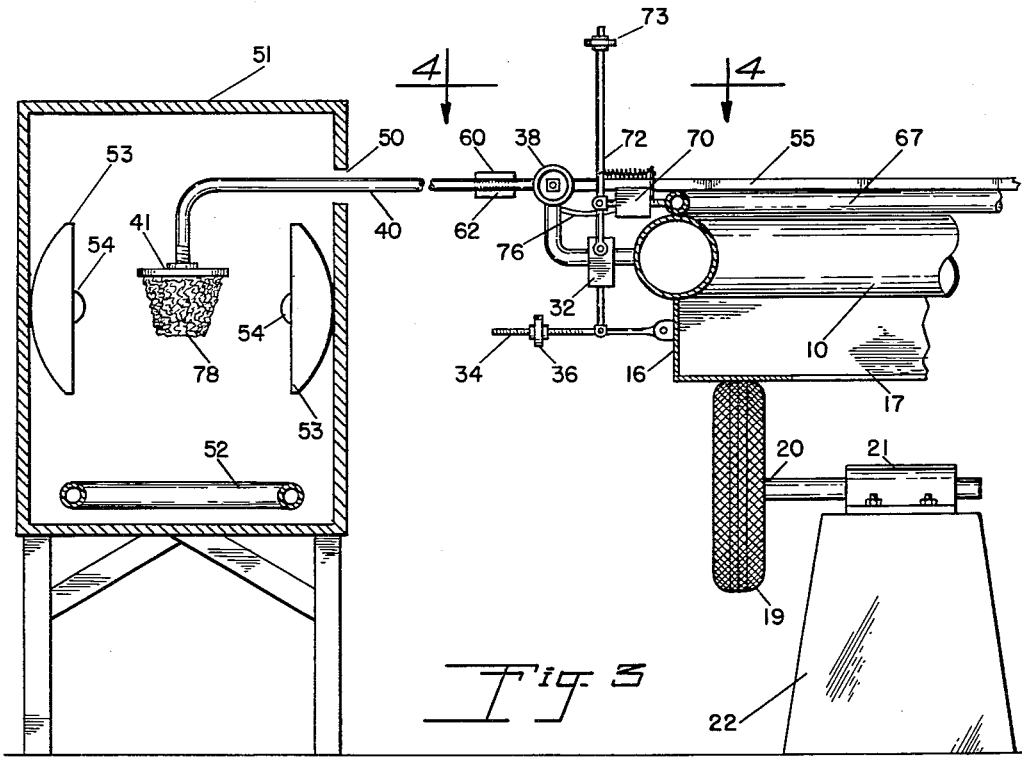
Fig. 3 is an enlarged vertical section taken substantially along the line 3—3 of Fig. 1.
Figure 4:
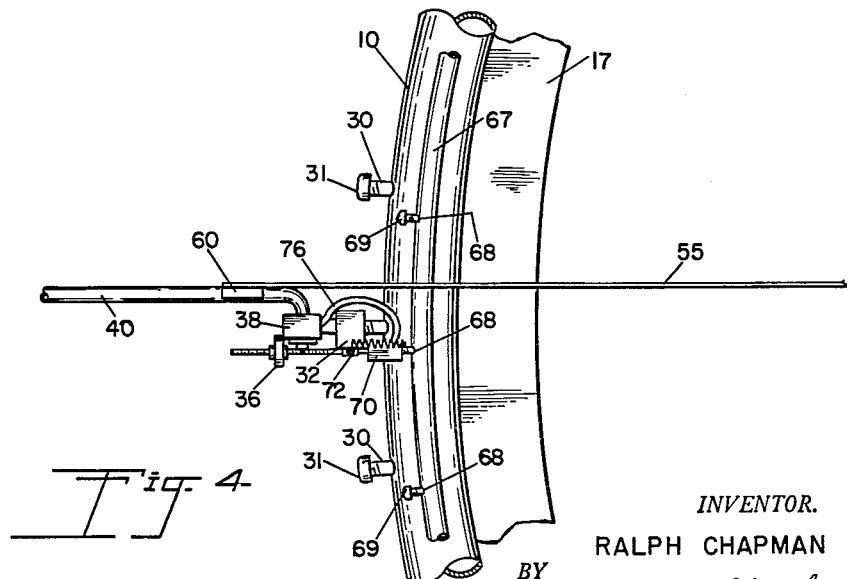
Fig. 4 is a horizontal section taken substantially along line 4—4 of Fig. 3.

When the traveling molds reach the exit end of the pulp tank, they are lifted from the pulp and continue movement with the arms 40 in a horizontal position, as indicated in Fig. 3, suction being continuously applied to the interior of the mold to hold the wet layer of pulp on the outer surface thereof and aid in the drying of the pulp. The arms 40 are guided into a continuous slot 50 in the inner vertical wall of an arcuate drying oven 51 of rectangular cross-section which extends about a major portion of the periphery of the machine, as distinguished from the minor extent of the tank 43. The ends of the drying oven 51 are open whereby nothing will be in the way of the wet, molded pulp articles adhering to the molds. Air is drawn through the ends of the drying oven and the slot 50, which air is constantly being drawn through the molded pulp articles to achieve substantial drying thereof. The air drying action, which lasts in the order of one to two or three minutes depending upon the speed of rotation of the machine, may be insufficient to create a self-sustaining article and therefore I provide a source of heat in the drying oven. The heat may be supplied by hot water or steam radiators 52 adjacent the bottom of the oven throughout its length, and this drying effect may be supplemented, if desired, by radiant heaters such as the reflectors 53 in which are mounted infrared bulbs 54. If the demand on the machine is low, the source or sources of heat may be cut off and the machine rotated slowly so that a self-supporting article will have been created by the time the mold reaches the exit end of the tunnel. However, if the demand is great the machine may be rotated at a faster speed.

The suction mold supporting arms 40 are each provided with a rearwardly extending counterweight bar 55 upon which is slidably mounted a counterweight 56 which may be held in adjusted position by means such as a thumb screw 57. It is desired that the bar 55 and the counterweight 56 approximately balance the suction arm 40 and the associated mold 42. All that can be achieved is an approximation, since at times the mold will support a very wet layer of pulp, the weight of which will gradually decrease as the article dries, and at times, when the mold is traveling between the exit end of the drying oven and the inlet end of the pulp tank, the mold will be freed of the layer of pulp. For this reason, the friction device 39 is desirable. In order to lower the molds into the tank, a lowering cam 58 is provided, the same being adjustably mounted upon an overhead support 59 suitably attached to an overhead portion of the building, the cam 58 being engageable with a friction pad 60 on the upper surface of the suction arm 40. In order to swing the molds out of the tank and cause the suction arms 40 to assume a horizontal position whereby they may enter the slot 50 in the oven 51, a reversely positioned cam 61 is mounted on the exit end of the wall of the tank 43 in position to engage a lower friction pad 62 on the lower surface of the suction arm 40.

A plurality of suction valve operating cams 63 are adjustably and removably mounted on the inner wall of the tank 43. The cam engaging wheels 36 are maintained in adjusted position longitudinally of the actuator arm 34, by means such as an inner raceway engaging a threaded portion of the arm whereby the wheels 36 may be shifted to engage a desired one of the cams 63. Thus, if one mold should be designed to create an article of extreme thickness, the wheel 36 would be adjustably positioned to engage a first cam 63 near the entrance end of the pulp tank, whereas if the article should be of minimum thickness, the wheel 36 would be adjustably positioned to engage a cam 63 positioned toward the center of the tank 43. Preferably, a plurality of such cams 63 are mounted at differing radial distances from the center of the machine so that articles having various thicknesses may be formed concurrently. The cams 63 are conveniently mounted for circumferential shifting in order that the speed of the machine may be altered while maintaining the same article thickness, or the amount of suction created by the pump 15 may be varied in proportion to the speed without shifting the cams. A plurality of reversely positioned shut-off cams 64 are mounted adjacent the exit end of the oven 51 whereby all of the molds will be shut off from the source of suction upon emerging from the oven.

In order to remove the dried and partially dried formed articles from the molds as they emerge from the oven, means are provided to connect the interiors of the suction molds to a source of air under pressure for a short period of time. Such means comprise a centrally disposed swivel hub 65 coaxial with hub 12, the interior of which is connected to a source of air pressure (not shown). A plurality of small, radially positioned pressure tubes 66 are mounted upon the upper surfaces of the spokes 11 and are connected at their outer ends to a continuous tube ring 67 which is mounted on the upper surface of the pipe rim 10. The outer surface of the ring 67 is provided with a plurality of nipples 68 which may be closed by gasketed caps 69, each nipple 68 being adjacent one of the nipples 30 for mounting the suction mold arms. When one of the suction mold arms is in position, the adjacent nipple 68 is uncapped and connected to an air valve 70 comprising a valve stem 71. The outer end of the valve stem is suitably connected to an operating arm 72 extending vertically upward and carrying a cam follower roller 73 at its upper end, the lower end of the arm being pivoted to the body of the valve 32. A spring 74 is tensioned between arm 72 and a fixed pin mounted on the valve body whereby the air valve 70 is normally held closed. A cam 75 mounted slightly beyond the exit end of the oven 51 engages each of the rollers 73 to open the valve 70 and hold it open for a short period of time. The valve communicates with the elbow 37 through a tube 76. It will be observed that the cam 75 is positioned between the cams 64 and the cams 62 so that the interior of the suction mold is shut off from the source of suction at this time whereby the air pressure existing within the ring 67 may be utilized to blow the dried or partially dried article from the surface of the mold. Preferably this action occurs when the mold is positioned above an endless traveling belt conveyor 77 upon which the articles indicated at 78 will be carried away to a packing station, or into other drying means.

The end of the conveyor 77 is spaced from the inlet end of the tank 43 a sufficient distance so that an attendant may, from time to time, clean the molds by directing a jet of steam against their outer surfaces. It will also be observed that a single operator may watch the output of the machine, by observing and, if necessary, picking up and inspecting finished articles from the conveyor 77. While at the same position he may clean the molds, and he is also in a convenient position to inspect the character of the slurry in the pulp tank and adjust the quantity of makeup by suitable means associated with the tank 47 (not shown). It will also be observed that the ends of the mold supporting arms 40 are threaded for association with the mold heads 41 whereby any mold may be quickly removed and replaced with another, or the arm capped, while the arm is traveling across the free space between the end of the conveyor 77 and the inlet end of the tank. Also, the mold arm 40 may be manually tipped upward after it leaves the cam 58 so that the operator may walk along the outer wall of the tank and work on the mold while the arm travels over the surface of the tank.

It will be observed that different sizes of counterweights 56 may be applied to the counterweight bars 55 in order to accommodate extreme differences in molds. However, for most molds adjustment of the counterweight 56 along the counterweight bar will be sufficient.

Having illustrated and described a preferred embodiment of my present invention, it should be apparent to those skilled in the art that the same permits of modification in arrangement and detail. I claim as my invention all such modifications as come within the true spirit and scope of the following claims.

I claim:

1. A pulp article molding machine comprising a horizontally disposed, driven wheel of large diameter and including a hollow rim, a plurality of radially disposed, hollow, mold supporting arms pivotally mounted on said rim and extending outwardly therefrom, a suction mold mounted on the outer end of each one of said arms in downwardly depending relation thereto, an upwardly open pulp tank disposed circumferentially about a minor portion of the periphery of said driven wheel, a drying oven disposed circumferentially about a major portion of the periphery of said driven wheel, said drying oven extending from said pulp tank in the direction of rotation of said driven wheel and having its exit end spaced from the entry end of said pulp tank, a tube mounted upon said hollow rim throughout the extent thereof, means constantly creating suction in said hollow rim, means connecting said tube to a source of air pressure, a suction valve associated with each one of said arms, means including said suction valves to place said arms in communication with said hollow rim, a pressure valve associated with each one of said arms, means including said suction valves to place said arms in communication with said tube, means successively to pivot said arms to move their outer ends in a downward direction and lower said suction molds into said pulp tank, means successively to pivot said arms to move their outer ends in an upward direction and raise said molds from said pulp tank, said drying oven having a continuous slot in its side facing said driven wheel through which said arms extend when passing through said drying oven whereby said molds pass through said drying oven from end to end thereof, said suction valves being of the type which remain in open or closed position until moved to the opposite position, means successively to open said suction valves while said molds are within said pulp tank, means adjacent the exit end of said drying oven to close said suction valves, means normally holding said pressure valves in closed position, and means successively to open said pressure valves for a short period of time while said molds are traveling from said oven toward said pulp tank.

2. The construction set forth in claim 1 wherein said means to open said suction valves comprises a radially extending actuator arm, a cam engaging element adjustably mounted on said actuator arm for movement radially with respect to said driven wheel, and a plurality of cams selectively engageable by said element, said cams being positioned at different radii from the center of said driven wheel and in spaced relation to each other circumferentially of said driven wheel between the ends of said pulp tank whereby the duration of application of suction to said molds while within said pulp tank may be varied.

3. The construction set forth in claim 1 wherein said driven wheel comprises a continuous, annular track of large diameter fixed to said hollow rim, and said machine comprises a plurality of supporting wheels upon which said track rests, said wheels being mounted for rotation about axes parallel to radii of said driven wheel.

4. The construction set forth in claim 1 wherein said driven wheel comprises a continuous, annular track of large diameter fixed to said hollow rim, and said machine comprises a plurality of supporting wheels upon which said track rests, said wheels being mounted for rotation about axes parallel to radii of said driven wheel, each of said supporting wheels comprising a pneumatic tire.

5. The construction set forth in claim 1 wherein said driven wheel comprises a continuous, annular track of large diameter fixed to said hollow rim, and said machine comprises a plurality of supporting wheels upon which said track rests, said wheels being mounted for rotation about axes parallel to radii of said driven wheel, each of said supporting wheels comprising a pneumatic tire, and means to rotate one of said supporting wheels whereby said molding machine is frictionally driven.

6. The construction set forth in claim 1 comprising means releasably to retain said suction molds on said mold supporting arms, a plurality of counterweight arms each rigidly secured to one of said mold supporting arms and extending inwardly over said hollow rim, and a plurality of counterweights each adjustably mounted for movement longitudinally of one of said counterweight arms.

7. The construction set forth in claim 1 wherein said pulp tank comprises arcuate side walls disposed concentrically with respect to said driven wheel, and an arcuate, intermediate wall concentrically disposed with respect to said driven wheel and having its ends terminating short of the ends of the tank, said molds dipping into said tank between one of said side walls and said intermediate wall, and means disposed in said tank for constantly circulating slurry disposed therein around said intermediate wall, said circulating means being arranged to move the slurry surrounding the submerged molds in the same direction as the direction of travel of said molds.

References Cited in the file of this patent

UNITED STATES PATENTS

| Number | Name | Date |
|---|---|---|
| 244,156 | Adams | July 12, 1881 |
| 341,163 | Peck | May 4, 1886 |
| 1,267,632 | Claussen | May 28, 1918 |
| 1,621,671 | Kennan et al. | Mar. 22, 1927 |
| 2,101,921 | Shaver | Dec. 14, 1937 |
| 2,111,422 | Fawick | Mar. 15, 1938 |
| 2,204,276 | Lass | June 11, 1940 |
| 2,301,858 | Danielson | Nov. 10, 1942 |
| 2,388,828 | Chaplin | Nov. 13, 1945 |